US009116898B2

(12) United States Patent
Shirakawa et al.

(10) Patent No.: US 9,116,898 B2
(45) Date of Patent: Aug. 25, 2015

(54) INFORMATION CONVERSION DEVICE, COMPUTER-READABLE RECORDING MEDIUM, AND INFORMATION CONVERSION METHOD

(71) Applicant: FUJITSU LIMITED, Kawasaki-shi (JP)

(72) Inventors: Shinichi Shirakawa, Ichikawa (JP); Makiko Konoshima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 13/717,149

(22) Filed: Dec. 17, 2012

(65) Prior Publication Data

US 2013/0262488 A1    Oct. 3, 2013

(30) Foreign Application Priority Data

Mar. 28, 2012  (JP) ................................. 2012-075195

(51) Int. Cl.
  *G06F 17/30*  (2006.01)
(52) U.S. Cl.
  CPC .... *G06F 17/30067* (2013.01); *G06F 17/30386* (2013.01); *G06F 17/30495* (2013.01); *G06F 17/30286* (2013.01); *G06F 17/30867* (2013.01)
(58) Field of Classification Search
  CPC .......... G06F 17/3002; G06F 17/30799; G06F 17/30864; G06F 17/30247; G06F 17/3061; G06F 17/30424; G06F 17/30495; G06F 17/30256; G06F 17/30743; G06F 17/30802; G06F 17/30011; G06F 17/30386; G06F 17/3069; G06F 17/30775; G06F 17/30825; G06F 17/30843
  USPC .......................................... 707/756, 791, 802
  See application file for complete search history.

(56) References Cited

U.S. PATENT DOCUMENTS 6,067,369 A    5/2000  Kamei
6,906,710 B2 *  6/2005  Matsuzaki et al. ............ 345/419
(Continued)

FOREIGN PATENT DOCUMENTS

JP           2815045       10/1998
JP        2000-322450     11/2000
(Continued)

OTHER PUBLICATIONS

M. Datar et al.; "Locality-Sensitive Hashing Scheme Based on p-Stable Distributions", Proceedings of the twentieth annual symposium on Computational Geometry (SCG '04) (2004), pp. 253-262.
(Continued)

*Primary Examiner* — Pierre Vital
*Assistant Examiner* — Andalib Lodhi
(74) *Attorney, Agent, or Firm* — Fujitsu Patent Center (57) ABSTRACT

An information conversion device includes a memory and a processor coupled to the memory. The processor executes a process including generating a conversion rule for converting a feature quantity vector into a binary string that is longer than a predetermined bit length. The process includes converting each of the feature quantity vectors into a binary string by using the conversion rule generated at the generating. The process includes calculating importance levels of the respective bits in the binary strings based on the distance-based relations among the feature quantity vectors. The process includes correcting the conversion rule into one that converts each of the feature quantity vectors into a binary string having the predetermined bit length based on the calculated importance levels. The process includes changing the feature quantity vectors into a binary string having the predetermined bit length by using the conversion rule corrected at the correcting.

17 Claims, 7 Drawing Sheets

(56) References Cited

U.S. PATENT DOCUMENTS

| | | |
|---|---|---|
| 7,246,314 B2 | 7/2007 | Foote et al. |
| 7,769,209 B2 | 8/2010 | Komura et al. |
| 8,224,849 B2 * | 7/2012 | Li et al. .................... 707/780 |
| 2007/0036400 A1 | 2/2007 | Watanabe et al. |
| 2010/0046810 A1 * | 2/2010 | Yamada .................... 382/124 |
| 2011/0038541 A1 | 2/2011 | Bober et al. |
| 2012/0215789 A1 * | 8/2012 | Ramanathan et al. ......... 707/747 |
| 2013/0132398 A1 * | 5/2013 | Pfeifle .................... 707/745 |

FOREIGN PATENT DOCUMENTS

| | | |
|---|---|---|
| JP | 2005-250972 | 9/2005 |
| JP | 2006-277407 | 10/2006 |
| JP | 2007-249339 | 9/2007 |
| JP | 2011-511340 | 4/2011 |

OTHER PUBLICATIONS

M. Charikar; "Similarity Estimation Techniques from Rounding Algorithms", Proceedings of the 34th Symposium on Theory of Computing (STOC '02) (2002), pp. 380-388.

Y. Weiss et al.; "Spectral Hashing", Advances in Neural Information Processing Systems 21 (NIPS '08) (2008), pp. 1-8.

B. Kulis et al.; "Learning to Hash with Binary Reconstructive Embeddings", Advances in Neural Information Processing Systems 22 (NIPS '09) (2009), pp. 1-9.

M. Norouzi et al.; "Minimal Loss Hashing for Compact Binary Codes", Proceedings of the 28th International Conference on Machine Learning (ICML '11) (2011).

D. G. Lowe; "Distinctive Image Features from Scale-Invariant Keypoints", Internal Journal of Computer Vision, vol. 60, No. 2 (Jan. 5, 2004), pp. 91-110.

H. Bay et al.; "Speeded-Up Robust Features (SURF)", Computer Vision and Image Understanding (CVIU), vol. 110, No. 3 (Sep. 10, 2008), pp. 346-359.

K. Kira et al.; "A Practical Approach to Feature Selection", Proceedings of the 9th International Workshop on Machine Learning (1992), pp. 249-256.

R. Gilad-Bachrach et al; "Margin Based Feature Selection—Theory and Algorithms", Proceedings of the 21st International Conference on Machine Learning (ICML '04) (2004), pp. 43-50.

* cited by examiner

| DATA ID | FEATURE QUANTITY |
|---------|------------------|
| 1 | a, b, c··· |
| ● | ● |
| ● | ● |

FIG.4

| DATA ID | SYMBOL STRING |
|---------|---------------|
| 1 | 01110100110··· |
| ● | ● |
| ● | ● |

INFORMATION CONVERSION DEVICE, COMPUTER-READABLE RECORDING MEDIUM, AND INFORMATION CONVERSION METHOD

CROSS-REFERENCE TO RELATED APPLICATION

This application is based upon and claims the benefit of priority of the prior Japanese Patent Application No. 2012-075195, filed on Mar. 28, 2012, the entire contents of which are incorporated herein by reference.

FIELD

The embodiments discussed herein are related to an information conversion device, a computer-readable recording medium, and an information conversion method.

BACKGROUND

Conventionally, there are known techniques with which pieces of data similar or relevant to inputted query data to the extent that the similarity or relevance thereof satisfy a predetermined condition are searched from multiple pieces of data registered in a database. As one example of such techniques, a technique called neighborhood search is known with which: the levels of similarity or relevance between pieces of data are represented as distances in a multidimensional feature quantity vector space; and pieces of data having distances from query data that do not exceed a threshold, or a predetermined number of pieces of data that are the closest to the query data are selected.

Figure 8:
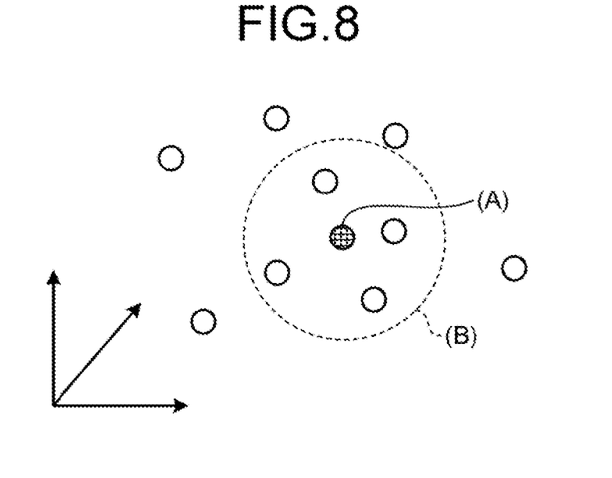
FIG. 8 is a diagram for illustrating conventional neighborhood search.

FIG. 8 is a diagram for illustrating a conventional neighborhood search. For example, an information processing apparatus that executes neighborhood search stores, as indicated with white circles in FIG. 8, the feature quantity vectors of pieces of data to be searched. Then, upon acquiring query data indicated by (A) in FIG. 8, the information processing apparatus calculates the distance between the query data and each of the feature quantity vectors, and sets, as neighboring data of the query data, pieces of data that fall within a predetermined range in terms of distance from the query data as indicated by (B) in FIG. 8.

Here, in a case where a database has a large number of pieces of data registered therein, calculation of the distances between all of the pieces of data and the query data leads to an increase in calculation cost involved in neighborhood search. Therefore, there are other known techniques each of which aims at reduction in calculation cost involved in neighborhood search in such a manner as to narrow down data to be searched by creating indices for the feature quantity vector space or by using indices that utilize distances from particular feature quantity vectors. However, these techniques are not capable of reducing the calculation cost in a case where each feature quantity vector has a large number of dimensions.

Hence, there are other known techniques with which, in order to reduce a calculation cost for neighborhood search, search processing is speeded up by relaxing the level of strictness on a search result and acquiring a set of similar data approximate to query data. For example, matching search between binary strings and calculation of hamming distances enable processing to be performed faster than calculation of distances between vectors. Hence, there are other known techniques with which reduction in calculation cost is enabled in such a manner that: feature quantity vectors are converted into binary strings with distance-based relations between the feature quantity vectors being maintained; and matching search or calculation of hamming distances with respect to a binary string obtained through conversion of query data is performed.

Figure 9:
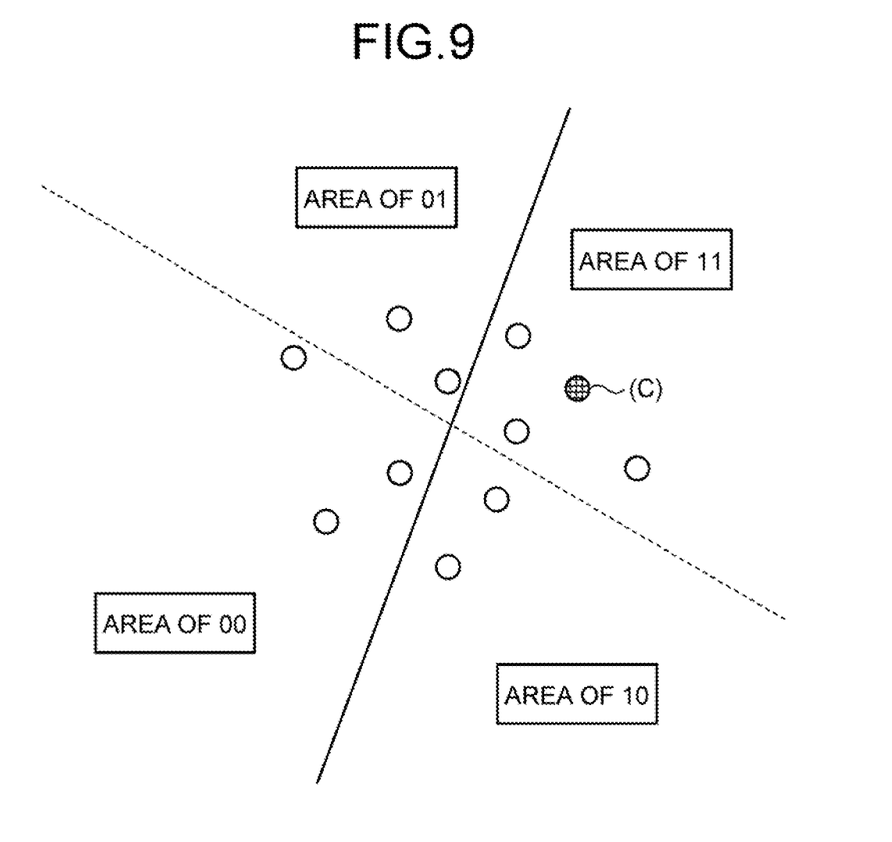
FIG. 9 is a diagram for illustrating search processing using binarization of real vectors.

One example of methods for converting such feature quantity vectors into binary strings is described below. FIG. 9 is a diagram for illustrating search processing using binarization. Note that a method for converting feature quantity vectors, indicated by white circles in FIG. 9, into 2-digit binary strings is described by the example illustrated in FIG. 9.

For example, an information processing apparatus stores feature quantity vectors indicated with white circles in FIG. 9. Here, the information processing apparatus applies a projective function thereto, thereby setting the first digits of binary strings to "1" for feature quantity vectors included in the area above a dotted line in FIG. 9, and to "0" for feature quantity vectors included in the area below the dotted line. Further, the information processing apparatus sets the second digits of binary strings to "1" for feature quantity vectors included in the area to the right of a solid line in FIG. 9, and to "0" for feature quantity vectors included in the area to the left of the solid line.

As a result, each of the feature quantity vectors is converted into any one of "01," "11," "00" and "10." Then, indicated by (C) in FIG. 9, in a case where a binary string obtained by converting query data is "11," the information processing apparatus sets, as neighboring data of the query data, feature quantity vectors converted into binary strings having hamming distances of "0," that is, those converted into binary strings "11."

Patent Document 1: Japanese Patent No. 2815045
Patent Document 2: Japanese Laid-open Patent Publication No. 2006-277407
Patent Document 3: Japanese Laid-open Patent Publication No. 2007-249339
Non-patent Document 1: Datar, M., Immorlica, N. Indyk, P., and Mirrokni, V. S., "Locality-sensitive Hashing Scheme Based on P-stable Distributions," *Proceedings of the Twentieth Annual Symposium on Computational Geometry (SCG '04)*, pp. 253-262, 2004
Non-patent Document 2: Charikar, M., "Similarity estimation techniques from rounding algorithms," *Proceedings of the 34th Symposium on Theory of Computing (STOC '02)*, pp. 380-388, 2002
Non-patent Document 3: Weiss, Y., Torralba, A., and Fergus, R., "Spectral Hashing," *Advances in Neural Information Processing Systems* 21 (*NIPS '08*), 2008
Non-patent Document 4: Kulis, B. and Darrell, T., "Learning to Hash with Binary Reconstructive Embeddings," *Advances in Neural Information Processing Systems* 22 (*NIPS '09*), 2009
Non-patent Document 5: Norouzi, M. and Fleet, D., "Minimal Loss Hashing for Compact Binary Codes," *Proceedings of the 28th International Conference on Machine Learning* (ICML '11), 2011
Non-patent Document 6: Lowe, D. G., "Distinctive Image Features from Scale-invariant Keypoints," *Internal Journal of Computer Vision*, Vol. 60, No. 2, pp. 91-110, 2004
Non-patent Document 7: Bay, H., Ess, A., Tuytelaars, T., and Gool, L. V., "SURF: Speeded Up Robust Features," *Computer Vision and Image Understanding (CVIU)*, Vol. 110, No. 3, pp. 346-359 (2008)
Non-patent Document 8: Kira, K. and Rendell, L. A., "A Practical Approach to Feature Selection," *Proceedings of the 9th International Workshop on Machine Learning*, pp. 249-256, 1992

Non-patent Document 9: Gilad-Bachrachy, R., Navotz, A. and Tishby, N., "Margin Based Feature Selection—Theory and Algorithms," *Proceedings of the 21st International Conference on Machine Learning (ICML '04)*, pp. 43-50, 2004

Here, in order for maintaining the accuracy of search in converting the feature quantity vectors into binary strings, it is important to convert feature quantity vectors into binary strings while maintaining distance-based relations among the original feature quantity vectors. However, the above described technique for converting feature quantity vectors into binary strings uses threshold processing to convert feature quantity vectors, which are continuous values, into non-continuous binary strings. Therefore, the technique involves a problem that it is difficult to optimize conversion functions that, while maintaining distance-based relations among the feature quantity vectors, convert feature quantity vectors into binary strings.

SUMMARY

According to an aspect of an embodiment, an information conversion device includes a memory and a processor coupled to the memory. The processor executes a process including generating a conversion rule for converting a feature quantity vector into a binary string that is longer than a predetermined bit length. The process includes converting each of the feature quantity vectors into a binary string by using the conversion rule generated at the generating. The process includes calculating importance levels of the respective bits in the binary strings based on a distance-based relations among the feature quantity vectors. The process includes correcting the conversion rule into one that converts each of the feature quantity vectors into a binary string having the predetermined bit length based on the calculated importance levels. The process includes changing the feature quantity vectors into a binary string having the predetermined bit length by using the conversion rule corrected at the correcting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

[a] First Embodiment

Figure 1:
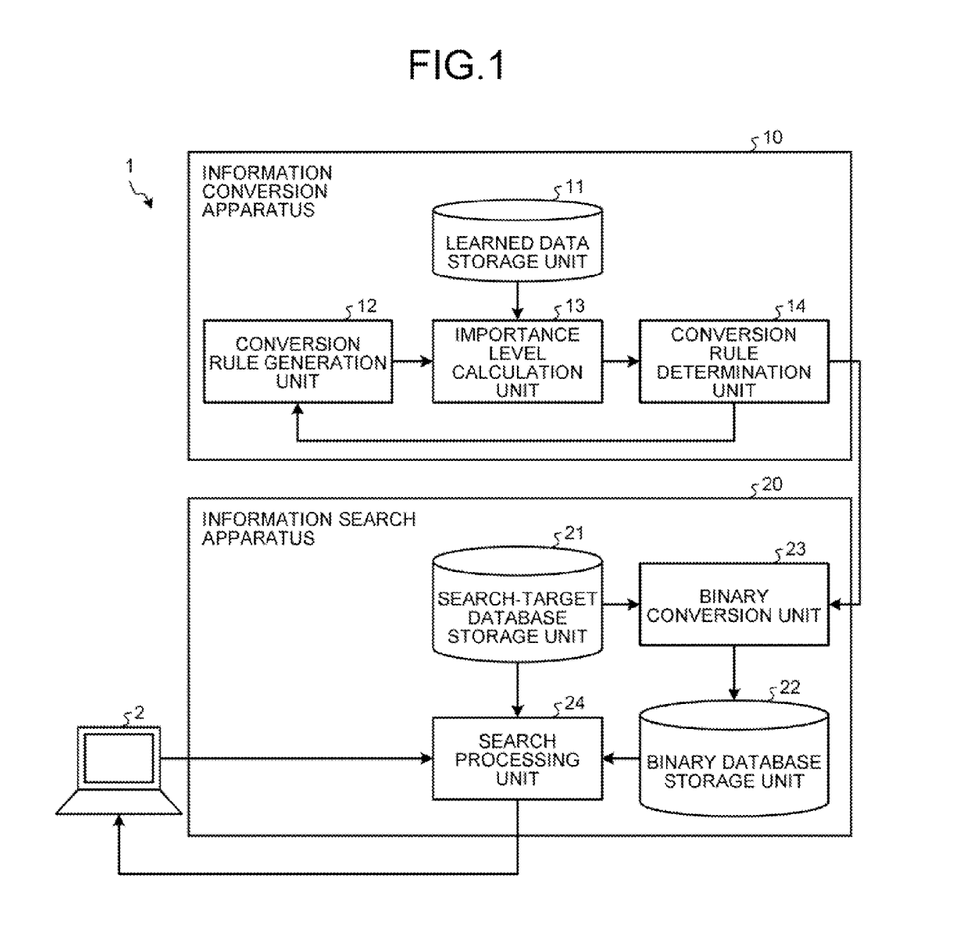
FIG. 1 is a diagram for illustrating the functional configuration of a search system according to a first embodiment.

In a first embodiment described below, one example of the functional configuration of a search system including an information conversion apparatus is described using FIG. 1. FIG. 1 is a diagram for illustrating the functional configuration of a search system according to the first embodiment. As illustrated in FIG. 1, a search system 1 includes a client apparatus 2, an information conversion apparatus 10, and an information search apparatus 20.

Further, the information conversion apparatus 10 includes a learned data storage unit 11, a conversion rule generation unit 12, an importance level calculation unit 13, a conversion rule determination unit 14. Further, the information search apparatus 20 includes a search-target database storage unit 21, a binary conversion unit 23, a binary database storage unit 22, and a search processing unit 24.

The search system 1 illustrated in FIG. 1 searches neighboring data of the query data from the search-target database storage unit 21 upon receiving query data from the client apparatus 2. Additionally, the search system is a system that notifies the client apparatus 2 whether data similar to the query data has been registered in the neighborhood of the query data. Specifically, in the search system 1, the information search apparatus 20 converts data to be searched into binary strings by the application of a conversion rule generated by the information conversion apparatus 10, and searches neighboring data of the query data.

Here, for example, data that the search system 1 searches is image data, audio data, or the like, and is biometric data for biometric authentication using fingerprint patterns or vein patterns. That is, the search system 1 is a system that, when biometric data of a user that has been inputted to the client apparatus 2 is received thereby as query data, determines whether the biometric data of the user has been registered.

Note that, while feature quantities of various kinds for image and audio data have been proposed, the search system 1 does not depend on the feature quantities of specific kinds, and is therefore enabled to use feature quantities of any kinds. For example, a SIFT feature quantity, a SURF feature quantity or the like, which is generally used as a feature quantity for an image, may be used as a feature quantity for an image. Feature quantities of these kinds are known as feature quantities that are robust against hiding and variation as a result of using local information in an image as feature quantity vectors. Feature quantity vectors in any form that indicate such feature quantities may be used.

Figure 2:
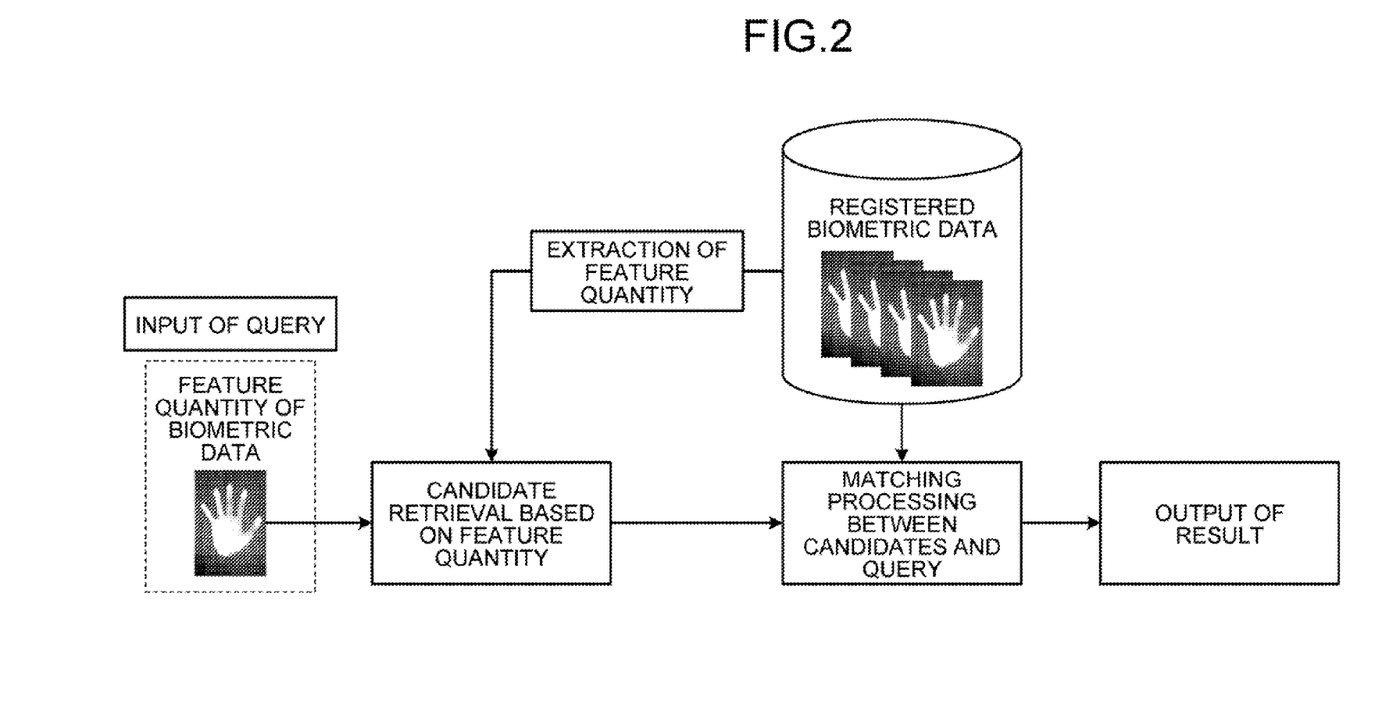
FIG. 2 is a diagram for illustrating one example of biometric authentication.

FIG. 2 is a diagram for illustrating one example of biometric authentication. Note that the example illustrated in FIG. 2 represents processing in ID-less 1:N authentication, where information such as an ID (Identification) of a user is not inputted, and no narrowing down of biometric data by using the ID of the user is involved. As illustrated in FIG. 2, the search system 1 stores multiple pieces of registered biometric data that have been registered by multiple users.

Then, upon receiving a piece of biometric data as query data from the client apparatus 2, the search system 1 extracts a feature quantity vector indicating the inputted piece of biometric data, and then searches pieces of the registered biometric data that have feature quantity vectors similar to the extracted feature quantity vector. That is, the search system 1 determines whether a piece of registered biometric data of a user who has inputted the query data has been registered.

Further, the search system 1 generates a conversion rule for converting a feature quantity vector into a binary string having a predetermined bit length, and then converts the feature quantity vectors of the registered pieces of biometric data into binary strings by applying the generated conversion rule. Additionally, the search system 1 converts, into a binary string having the predetermined bit length, the feature quantity vector corresponding to the piece of biometric data that has been inputted as the query data. Then, the search system 1 calculates the hamming distances therefrom of the binary strings obtained by converting the feature quantity vectors of the registered pieces of biometric data. Then, the search system 1 extracts, as candidates for those to be searched, the registered pieces of biometric data that have the hamming distances not exceeding a predetermined threshold. Thereafter, the search system 1 executes strict matching processing between the searched registered pieces of biometric data and the piece of biometric data inputted as the query data, and outputs the execution result to the client apparatus 2.

Thus, the search system 1 narrows down data to be searched, by converting, into binary strings in a predetermined form, the feature quantity vectors indicating the features of the registered pieces of biometric data to be searched, and calculating the hamming distances thereof from the binary string obtained by converting the feature quantity vector of the query data. Then, the search system 1 performs matching between data obtained by narrowing down the original data and the query data, thereby performing matching in biometric authentication.

Note that, in a case where the inputted biometric data and the registered biometric data are in the form of images, a feature quantity vector is obtained by vectorizing, for example, values representing the direction, length and slope of a ridge in a specific region within each image, and the densities and coordinates of characteristic points, such as the terminals and branching points, of the ridge. On the other hand, in a case where the inputted biometric data and the registered biometric data are in the form of voice, a feature quantity vector is obtained by vectorizing values representing the distributions, the levels of strength and the peak values of frequency components.

Described below are processing to be executed by the information conversion apparatus 10 and processing to be executed by the information search apparatus 20. Firstly, the processing to be executed by the information conversion apparatus 10 is described. The information conversion apparatus 10 uses learned data stored in the learned data storage unit 11 to generate a conversion rule that converts a feature quantity vector into a binary string having a predetermined bit length.

Specifically, the learned data storage unit 11 stores, as learned data, a plurality of feature quantity vectors with respect to each user. Here, feature quantity vectors stored in the learned data storage unit 11 are those included among feature quantity vectors stored in the search-target database storage unit 21 which is described below. That is, the learned data storage unit 11 stores a part of those included among feature quantity vectors stored in the search-target database storage unit 21.

Further, the learned data storage unit 11 stores among feature quantity vectors stored in the search-target database storage unit 21, feature quantity vectors of biometric data that have been registered by a plurality of users. Note that, in the following description, a plurality of feature quantity vectors registered by the same user is referred to as feature quantity vectors belonging to the same class. That is, the learned data storage unit 11 stores feature quantity vectors belonging to one class and feature quantity vectors belonging to other classes.

The conversion rule generation unit 12 generates a conversion rule for converting a feature quantity vector into a binary data having a bit length longer than the predetermined bit length. For example, in a case where the information search apparatus 20 is to execute search processing using "M"-bit binary strings, the conversion rule generation unit 12 generates "N" conversion functions for converting feature quantity vectors into 1-bit binary strings. Here, "M" and "N" are integers that satisfy M<N. Then, the conversion rule generation unit 12 transmits the generated "N" conversion functions to the importance level calculation unit 13.

Further, the conversion rule generation unit 12 receives M conversion functions. Then, the conversion rule generation unit 12 newly generates (N−M) conversion functions, and transmits the newly generated (N−M) conversion functions to the importance level calculation unit 13.

Here, conversion functions to be generated by the conversion rule generation unit 12 are described. For example, the information search apparatus 20 generates N sets of N-dimensional parameter vectors $w_i$ and offset parameters $b_i$. Then, the conversion rule generation unit 12 generates N conversion functions each defined by formula (1) given below.

Note that, while $u_i$ in boldface type in formula (1) denotes the i-th bit in a binary string u obtained by the conversion, x in boldface type therein denotes a feature quantity vector. In addition, thr( ) in formula (1) denotes a threshold function, which is a function that converts a value in the parentheses to "1" when the value is more than or equal to 0, or to "0" when the value is a negative value.

$$u_i = thr(w_i \cdot x + b_i) \quad (1)$$

That is, the information search apparatus 20 generates N formulae, each of which is formula (1), where i takes values of "1" to "N," and then transmits thus generated N conversion functions to the importance level calculation unit 13. Note that, by using random numbers or the like, the conversion rule generation unit 12 generates the parameter vectors $w_i$ and the offset parameters $b_i$ so that values of the parameter vectors $w_i$ and the offset parameters $b_i$ may be different by corresponding bit (found by the value of the suffix i).

Upon receiving the N conversion functions from the conversion rule generation unit 12, the importance level calculation unit 13 acquires the feature quantity vectors stored in the learned data storage unit 11, and generates an N-bit binary string u through calculation using formula (1) with respect to each feature quantity vector. For example, the importance level calculation unit 13 calculates the value of the first bit $u_1$ of the binary string u through calculation using formula (1) with respect to one feature quantity vector by using the parameter vector $w_1$ and the offset parameter $b_1$. Then, the importance level calculation unit 13 calculates the values of the other bits $u_2$ to $u_N$ of the binary string u by using the parameter vectors $w_2$ to $w_N$ and the offset parameters $b_2$ and $b_N$.

Then, the importance level calculation unit 13 calculates importance levels of the respective bits $u_1$ to $u_N$ of the binary string u so that the importance levels may accord with distance-based relations among the feature quantity vectors stored in the learned data storage unit 11. That is, the information conversion apparatus 10 calculates the importance levels of the respective bits $u_1$ to $u_N$ of the binary string u to thereby evaluate the importance levels of the N conversion functions that convert the feature quantity vectors into the respective bits $u_1$ to $u_N$.

Then, any method that appropriately maintains distance-based relations found between the feature quantity vectors before the conversion may be used as a method used by the importance level calculation unit 13 to calculate the importance levels of the respective bits $u_1$ to $u_N$ of the binary string u. For example, the importance level calculation unit 13 may calculate the importance levels of the respective bits $u_1$ to $u_N$ by using a technique called RELIEF presented in "A Practical Approach to Feature Selection," *Proceedings of the 9th International Workshop on Machine Learning*, pp. 249-256, 1992, or a technique called Simba presented in "Margin Based Feature Selection—Theory and Algorithms," *Proceedings of the 21st International Conference on Machine Learning (ICML '04)*, pp. 43-50, 2004.

As one example of processing that the importance level calculation unit 13 executes to calculate the importance levels of the respective bits $u_1$ to $u_N$ of the binary string u, processing to calculate the importance levels of the respective bits $u_1$ to $u_N$ of the binary string u in a manner depending on the class to which the feature quantity vectors belong is described below. First of all, the importance level calculation unit 13 converts the feature quantity vectors stored in the learned data storage unit 11 into N-bit binary strings by using conversion functions received from the conversion rule generation unit 12.

Then, the importance level calculation unit 13 takes one binary string as a sample of the binary string u, and calculates the weighted hamming distances of the other binary strings and the binary string u by using formula (2) given below. Here, $s_i$ in formula (2) denotes the importance level of $u_i$, and is set to "1" for each of the bits $u_1$ to $u_N$ in the initial state. In addition, v in formula (2) denotes a binary string taken to be compared with the binary string u.

$$\|u-v\|_s = \sqrt{\Sigma_i s_i^2 (u_i - v_i)^2} \quad (2)$$

Further, the importance level calculation unit 13 updates the importance level of $u_i$ of the binary string u by using formula (3) given below. Here, nearhit(u)$_i$ denotes the i-th bit value of a binary string, among binary strings obtained by converting feature quantity vectors belonging to the same class as the feature quantity vectors converted into the binary data u belong to, that has a weighted hamming distance that is the closest to the weight hamming distance of the binary string u.

$$s_i = s_i + \frac{1}{2}\left(\frac{(u_i - nearmiss(u)_i)^2}{\|u - nearmiss(u)\|_s} - \frac{(u_i - nearhit(u)_i)^2}{\|u - nearhit\|_s}\right) s_i \quad (3)$$

Here, feature quantity vectors belonging to the same class are of biometric data of the same user. Accordingly, the importance level calculation unit 13 increases the importance levels of the conversion functions in a case where a relatively short hamming distance between binary strings obtained by converting feature quantity vectors belonging to the same class is given with formulae (2) and (3). Here, feature quantity vectors belonging to different classes are of biometric data of different users. It is therefore preferable that conversion of feature quantity vectors belonging to different classes result in a relatively long hamming distance between binary strings obtained thereby. For this reason, the importance level calculation unit 13 lowers the importance levels of the conversion functions in a case where a relatively short hamming distance between binary strings obtained by converting feature quantity vectors belonging to different classes is given with formulae (2) and (3).

The importance level calculation unit 13 updates the importance levels $s_1$ to $s_N$ of the conversion functions of the respective bits a predetermined number of times. Then, the importance level calculation unit 13 notifies the conversion rule determination unit 14 of the updated importance levels $s_1$ to $s_N$ after having updated the importance levels $s_1$ to $s_N$ the predetermined number of times. Additionally, the importance level calculation unit 13 notifies the conversion rule determination unit 14 of conversion functions received from the conversion rule generation unit 12.

The importance level calculation unit 13 thus updates the importance levels $s_1$ to $s_N$ in a manner depending on the distance-based relations between feature quantity vectors and classes to which feature quantity vectors belong, and therefore, is capable of generating a conversion rule that maintains distance-based relations found between feature quantity vectors before the conversion. Note that, even when the classes are not taken in consideration, the importance level calculation unit 13 is capable of generating an appropriate conversion rule because the importance level of a conversion function that maintains distance-based relations found between feature quantity vectors at conversion source is increased in updating the importance levels $s_1$ to $s_N$ in a manner depending on distance-based relations between feature quantity vectors before the conversion.

Corresponding to the updated importance levels calculated by the importance level calculation unit 13, the conversion rule determination unit 14 corrects the conversion rule generated by the conversion rule generation unit 12, so that feature quantity vectors may be converted into a binary string having the predetermined bit length. Specifically, the conversion rule determination unit 14 receives the importance levels $s_1$ to $s_N$ calculated by the importance level calculation unit 13. Upon reception, the conversion rule determination unit 14 compares the received importance levels $s_1$ to $s_N$, and selects M bits by the order of having the higher importance level. Then, the conversion rule determination unit 14 identifies M conversion functions used for converting feature quantity vectors into the selected bits. That is, the conversion rule determination unit 14 identifies M conversion functions that have suitably binarized distance-based relations between feature quantity vectors.

Further, the conversion rule determination unit 14 determines whether the selection of the importance levels has been performed the predetermined number of times. Upon determining that the selection of the importance levels has not yet been performed the predetermined number of times, the conversion rule determination unit 14 notifies the conversion rule generation unit 12 of the M conversion functions identified thereby. On the other hand, upon determining that the selection of the importance levels has been performed the predetermined number of times, the conversion rule determination unit 14 transmits the M conversion functions identified thereby to the information search apparatus 20.

Note that the conversion rule determination unit 14 may selects conversion functions by using an alternative method. For example, the conversion rule determination unit 14 selects bits having importance levels that exceed a predetermined threshold value, and identifies conversion functions used for converting feature quantity vectors into the selected bits. Then, until the number of the conversion functions identified thereby reaches M, the conversion rule determination unit 14 continues causing the conversion rule generation unit 12 and the importance level calculation unit 13 to generate conversion functions and calculate importance levels. Thereafter, the conversion rule determination unit 14 transmits the M conversion functions identified thereby to the information search apparatus 20.

Next, the processing to be executed by the information search apparatus 20 is described. The search-target database storage unit 21 stores data to be searched, namely, feature quantity vectors of the registered biometric data. Specifically, the search-target database storage unit 21 stores the feature quantity vectors of the registered biometric data and data IDs which are identifiers for users who have registered the registered biometric data, while associating the feature quantity vectors with the data IDs. That is, the search-target database storage unit 21 stores the feature quantity vectors while classifying these vectors according to class to which these vectors belong.

Figure 3:
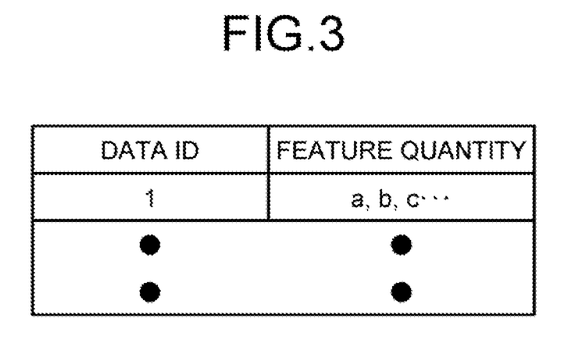
FIG. 3 is a diagram for illustrating one example of information that a search-target database storage unit stores.

Here, one example of information that the search-target database storage unit 21 stores is described using FIG. 3. FIG. 3 is a diagram for illustrating one example of information stored by the search-target database storage unit. For example, in the example illustrated in FIG. 3, the search-target database storage unit 21 stores a data ID "1" and feature quantity vectors "a," "b," and "c," indicated in boldface type, in a manner associating these vectors with this data ID. Note that the search-target database storage unit 21 stores other feature quantity vectors associated with this data ID although such vectors are omitted from FIG. 3.

Referring back to FIG. 1, the binary database storage unit 22 stores symbol strings in a manner associating these symbol strings with data IDs. Each of the symbol strings is a symbol string obtained by converting feature quantity vectors by using predetermined conversion functions, and contains a binary symbol and a wildcard symbol. One example of information that the binary database storage unit 22 stores is described using FIG. 4.

Figure 4:
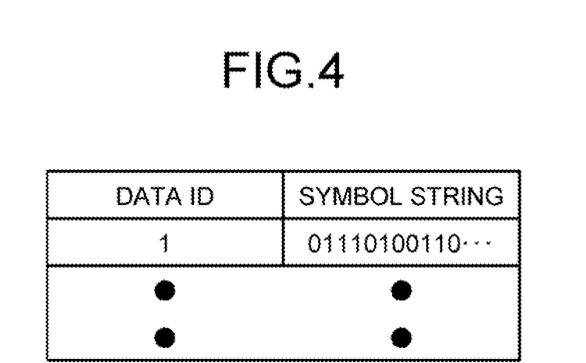
FIG. 4 is a diagram for illustrating one example of information that a binary database storage unit stores.

FIG. 4 is a diagram for illustrating one example of information that the binary database storage unit stores. For example, in the example illustrated in FIG. 4, the binary database storage unit 22 stores an M-bit binary string "01110100110 . . . " while associating this binary string with the data ID "1." Note that the binary database storage unit 22 stores other two or more symbol strings while associating these symbol strings with the data ID "1," although such symbol strings are omitted from FIG. 4. That is, the binary database storage unit 22 stores M-bit binary strings into which feature quantity vectors stored in the search-target database storage unit 21 have been converted by the below-described binary conversion unit 23 by use of conversion functions received from the information conversion apparatus 10, while classifying these binary strings according to class to which these binary strings belong.

Referring back to FIG. 1, upon receiving the conversion functions from the conversion rule determination unit 14 of the information conversion apparatus 10, the binary conversion unit 23 converts the feature quantity vectors stored in the search-target database storage unit 21 into M-bit binary strings by using the received conversion functions. Then, the binary conversion unit 23 stores the binary strings thus obtained by the conversion in the binary database storage unit 22 while associating these binary strings with data IDs associated with feature quantity vectors that have been converted into the respective binary strings.

The search processing unit 24, upon receiving query data from the client apparatus 2, extracts feature quantity vectors indicating feature quantities corresponding to the received query data, and converts the extracted feature quantity vectors by using predetermined conversion functions. Then, search processing unit 24 searches, out of the binary strings stored in the binary database storage unit 22, binary strings that have hamming distances less than or equal to a predetermined value, namely, binary strings into which feature quantity vectors to be selected as candidate of neighboring data of the query data have been converted.

Thereafter, the search processing unit 24 extracts, from the search-target database storage unit 21, the feature quantity vectors having been converted into thus searched binary strings. Then, the search processing unit 24 executes processing as below when, among the feature quantity vectors thus extracted thereby, feature quantity vectors identical to the feature quantity vectors extracted from the query data are found or a feature quantity vector having a Euclidean distance therefrom less than or equal to a predetermined threshold is found. That is, the search processing unit 24 transmits to the client apparatus 2 the notification that data from the registered biometric data is identical to the query data.

On the other hand, the search processing unit 24 executes processing as below when, among the feature quantity vectors thus extracted thereby, feature quantity vectors identical to the feature quantity vectors extracted from the query data are not found or a feature quantity vector having a Euclidean distance therefrom less than or equal to a predetermined threshold is not found. That is, the search processing unit 24 transmits to the client apparatus 2 the notification that no data from the registered biometric data is identical to the query data. As a result, the client apparatus 2 is enabled to perform biometric authentication of a user who have inputted the query data.

The conversion rule generation unit 12, the importance level calculation unit 13, the conversion rule determination unit 14, the binary conversion unit 23, and the search processing unit 24 are, for example, electronic circuits. An integrated circuit such as an ASIC (Application Specific Integrated Circuit) or an FPGA (Field Programmable Gate Array), a CPU (Central Processing Unit), or an MPU (Micro Processing Unit) is applied here as an example of such an electronic circuit.

Additionally, the learned data storage unit 11, the search-target database storage unit 21, the binary database storage unit 22 are storage devices such as a semiconductor memory device such as a RAM (Random Access Memory) or a flash memory, a hard disk, or an optical disc.

Figure 5:
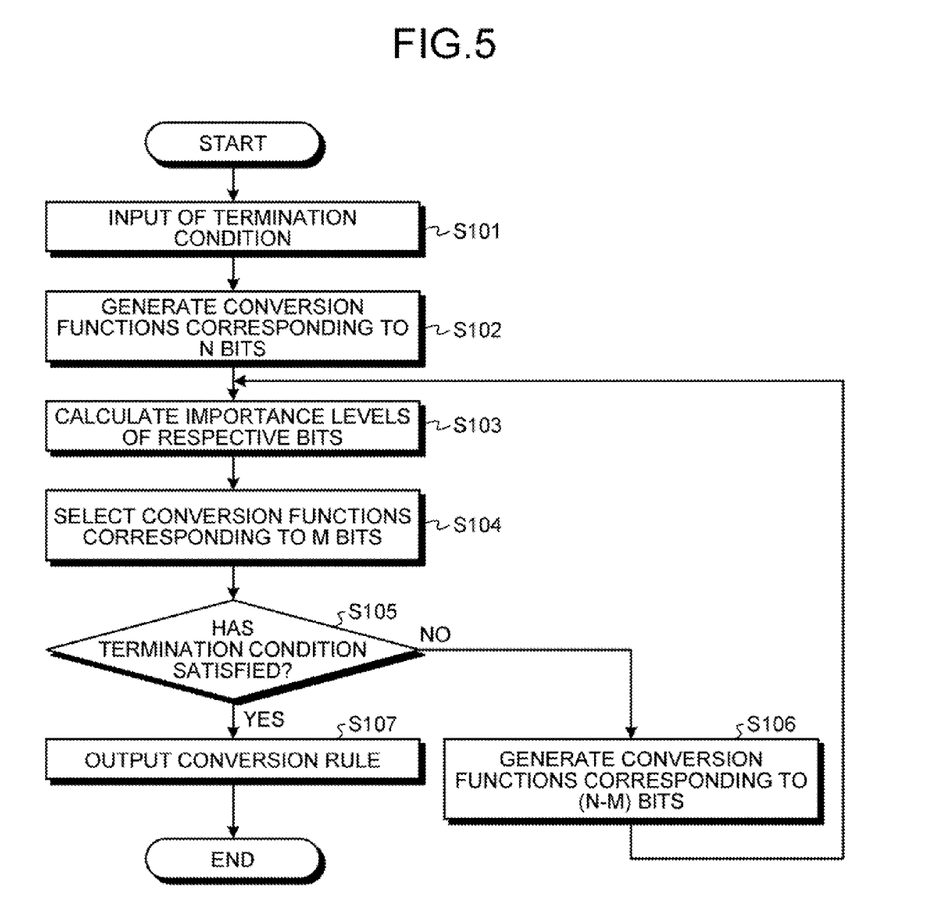
FIG. 5 is a flowchart for illustrating the flow of processing for generating conversion rules diagram.

Next, processing to be executed by the information conversion apparatus 10 to generate a conversion rule is described using FIG. 5. FIG. 5 is a flowchart for illustrating the flow of the processing for generating conversion rules. First of all, the information conversion apparatus 10 accepts input of a termination condition (step S101). For example, the information conversion apparatus 10 acquires, as the termination condition, a setting for the number of times that the processing is to be repeated.

Subsequently, the information conversion apparatus 10 generates conversion functions corresponding to N bits (step S102). Then, the information conversion apparatus 10 calculates the importance levels $s_1$ to $s_N$ of the respective bits (step S103). Subsequently, based on the importance levels $s_1$ to $s_N$ of the respective bits calculated in the processing in step S103, the information conversion apparatus 10 selects conversion functions corresponding to M bits from the conversion functions corresponding to N bits (step S104).

Subsequently, the information conversion apparatus 10 determines whether the termination condition accepted in step S101 has been satisfied (step S105). Then, when the termination condition has not been satisfied (No in step S105), the information conversion apparatus 10 newly generates conversion functions corresponding to (N−M) bits (step S106). Then, the information conversion apparatus 10 executes the processing in step S103 by using the conversion functions newly generated in step S106 corresponding to (N−M) bits and the conversion functions selected in step S104.

On the other hand, when the termination condition has been satisfied (Yes in step S105), the information conversion apparatus 10 outputs the conversion functions selected in step S104 to the information search apparatus (step S107), and finishes processing.

Figure 6:
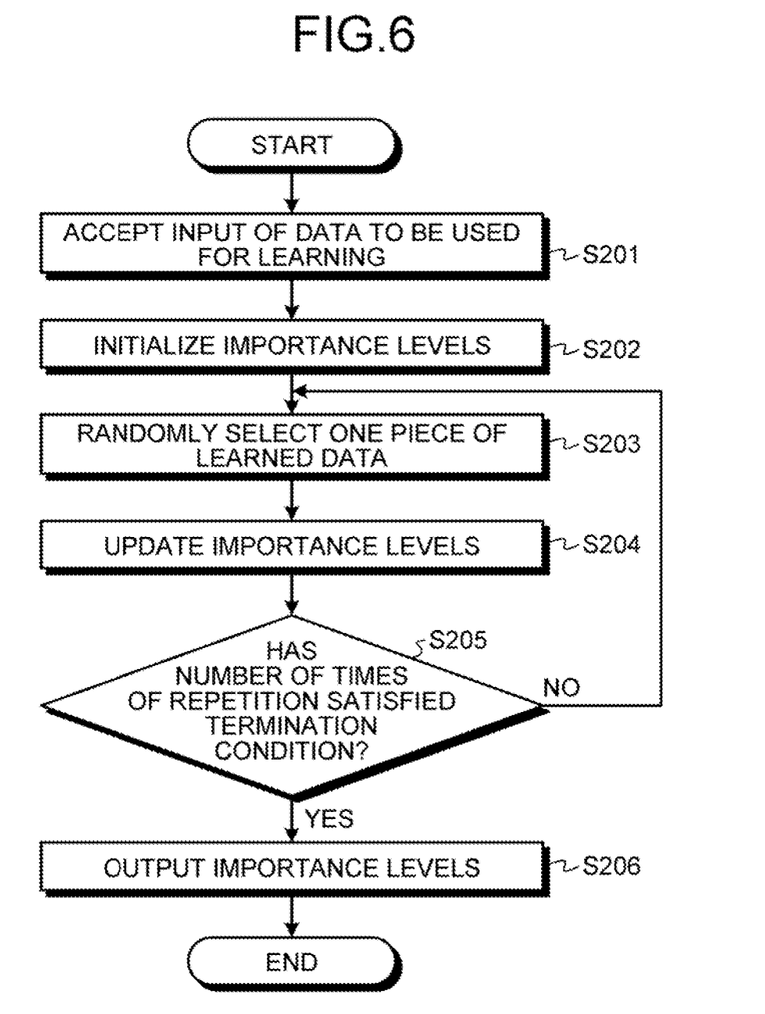
FIG. 6 is a flowchart for illustrating the flow of processing for calculating the importance level of a conversion function.

Next, the flow of processing to be executed by the importance level calculation unit 13 to calculate the importance levels of the each bit, namely, the importance levels of conversion functions, is described using FIG. 6. FIG. 6 is a flowchart for illustrating the flow of the processing for calculating the importance levels of conversion functions. Note that the processing in FIG. 6 corresponds the processing in step S103 illustrated in FIG. 5.

First of all, the importance level calculation unit 13 previously acquires, as data to be used for leaning, a portion of feature quantity vectors stored in the search-target database storage unit 21 and stores this portion in the learned data storage unit 11 (step S201). In this acquisition, the importance level calculation unit 13 acquires feature quantity vectors that belong to a plurality of classes.

Subsequently, the importance level calculation unit 13 initializes all of the importance levels $s_1$ to $s_N$ of the respective bits to "1" (step S202). Subsequently, upon acquiring the conversion functions corresponding to N bits, the importance level calculation unit 13 randomly selects one of the feature quantity vectors stored in the learned data storage unit 11, as a piece of learned data (step S203). Then, the importance level calculation unit 13 performs calculation using formulae (1) and (2) with respect to the piece of learned data, thereby updating the respective importance levels $s_1$ to $s_N$ of the respective bits (step S204).

Subsequently, the importance level calculation unit 13 determines whether the number of times of repetition has satisfied the termination condition (step S205). Then, upon determining that the number of times of repetition has satisfied the termination condition (Yes in step S205), the importance level calculation unit 13 outputs the importance levels $s_1$ to $s_N$ to the conversion rule determination unit 14 (step S206), and finishes processing. On the other hand, upon determining that the number of times of repetition has not satisfied the termination condition (No in step S205), the importance level calculation unit 13 executes the processing in step S203 again.

Effects of First Embodiment

As described above, the information conversion apparatus 10 generates a conversion rule for converting a feature quantity vector into a binary string having a bit length of N. Then, the information conversion apparatus 10 converts feature quantity vectors into binary strings by applying the generated conversion rule, and calculates the importance levels of the feature quantity vectors on the basis of distance-based relations found among the feature quantity vectors.

Subsequently, the information conversion apparatus 10 corrects the conversion rule so that the conversion rule may convert a feature quantity vector into a binary string having a bit length of M. Thereafter, using the conversion rule corrected by the information conversion apparatus 10, the information search apparatus 20 converts feature quantity vectors into binary strings each having a bit length of M. As a result, the search system 1 is enabled to generate the most appropriate conversion functions with respect to each set of data to be searched.

Further, the information conversion apparatus 10 generates N conversion functions that convert a feature quantity vector into a 1-bit binary string, and converts a feature quantity vector into a 1-bit binary string by using these generated N conversion functions. Then, the information conversion apparatus 10 calculates the importance levels for the bit of the N-bit binary string, and selects M conversion functions from the generated N conversion functions based on thus calculated importance levels.

That is, the information conversion apparatus 10 generates conversion functions for converting a feature quantity vector into bits, the number of which is larger than the number of bits needed for the search processing. Then, the information conversion apparatus 10 selects, from thus generated conversion functions, only conversion functions that perform conversion through which distance-based relations between feature quantity vectors are maintained. As a result, the information conversion apparatus 10 is enabled to maintain distance-based relations between feature quantity vectors by using a smaller number of bits than in the conventional cases. Additionally, the information conversion apparatus 10 is enabled to generate binary strings that have a small number of bits per each with maintaining distance-based relations between feature quantity vectors. It is thereby made possible to speed up the search processing executed by the information search apparatus 20.

Further, the information conversion apparatus 10 is enabled to generate a conversion rule that results in a smaller hamming distance between binary strings when the binary strings are those obtained by converting feature quantity vectors belonging to the same class. As a result, it is made possible to improve the precision of the search processing using hamming distances in the information search apparatus 20.

Further, the information conversion apparatus 10 selects, from the generated N conversion functions, M conversion functions in descending order of the importance levels. As a result, the information conversion apparatus 10 is enabled to generate a conversion rule that more accurately converts feature quantity vectors into binary strings.

Further, the information conversion apparatus 10 repetitively executes the processing described below. That is, after selecting the M conversion functions, the information conversion apparatus 10 newly generates (N−M) conversion functions, then generates an N-bit binary string again by using the selected M conversion functions and these (N−M) conversion functions, and then calculates the importance levels of the respective bits of thus generated binary string. Then, the information conversion apparatus 10 newly selects the M conversion functions based on thus calculated importance levels.

As a result, the information conversion apparatus 10 is enabled to select, from a large number of conversion functions, conversion functions having higher importance levels than the other conversion functions. Therefore, the information conversion apparatus 10 is enabled to generate a more precise conversion rule.

Further, the information conversion apparatus 10 repetitively executes generation of new conversion functions and calculation of importance levels until M conversion functions, the importance levels of which exceed the predetermined threshold, are selected. Therefore, the information conversion apparatus 10 is enabled to select, from a large number of conversion functions, conversion functions having higher importance levels than the other conversion functions, and generate a more precise conversion rule.

Further, the information conversion apparatus 10 generates conversion functions by using s parameter vectors and offset parameters generated in a random manner, and therefore, is enabled to generate conversion functions that appropriately binarize a feature quantity vector space.

Further, the information conversion apparatus 10 calculates importance levels based on a difference between: the smallest of the hamming distances between pairs of binary strings where each of the pairs is obtained by converting feature quantity vectors belonging to the same class; and the smallest of the hamming distances between pairs of binary strings where each of the pairs is obtained by converting feature quantity vectors belonging to different classes.

For example, when a pair of binary strings obtained by converting feature quantity vectors from the same class by using formulae (2) and (3) gives a shorter hamming distance, the information conversion apparatus 10 increases the importance level of a corresponding conversion function. On the other hand, when a pair of binary strings into which feature quantity vectors belonging to different classes have been converted is obtained using formulae (2) and (3) gives a shorter hamming distance, the information conversion apparatus 10 lowers the importance level of a corresponding conversion function.

As a result, the information conversion apparatus 10 is enabled to, when feature quantity vectors are converted into binary strings, generate a conversion rule that reflects distance-based relations among the feature quantity vectors and classes to which the feature quantity vectors belong. Therefore, the information conversion apparatus 10 is enabled to provide a higher level of precision to the search without slowing down the processing speed of the search processing executed by the information search apparatus 20.

Besides, the information search apparatus 20 uses a conversion rule, generated by the information conversion apparatus 10, for converting feature quantity vectors to be searched into binary strings. Further, the information search apparatus 20 converts a feature quantity vector extracted from query data into a binary string. Then, the information search apparatus 20 searches feature quantity vectors located in the neighborhood of the query data, by using the hamming distances to the binary strings into which the feature quantity vectors to be searched have been converted from the binary string into which the feature quantity vector extracted from the query data has been converted.

Here, processing of calculating the hamming distances is more speedily executable than processing of calculating the Euclidian distances between feature quantity vectors. Therefore, the information search apparatus 20 is enabled to provide a higher processing speed to the search processing. Further, the information search apparatus 20 converts feature quantity vectors into binary strings by using M conversion functions selected from N conversion functions based on the importance levels thereof by the information conversion apparatus 10. As a result, the information search apparatus 20 is enabled to execute the search processing at high speed without deteriorating the precision of the search.

[b] Second Embodiment

Although one embodiment according to the present invention is described above, embodiments other than the above described embodiment may be implemented in many different forms. Accordingly, another embodiment included in the present invention is described below as a second embodiment.

(1) Regarding Conversion Functions to be Selected

The information conversion apparatus 10 described above selects conversion functions that have converted feature quantity vectors into bits having high importance levels. However, embodiments are not limited to this, and, for example, the information conversion apparatus 10 may always select a conversion function for converting a feature quantity vector into a bit that clearly has a high importance level. For example, in a case where there is a conversion function known for being effective when feature quantity vectors to be searched fall within a particular type, the information conversion apparatus 10 may always include this conversion function in a conversion rule. Alternatively, the information conversion apparatus 10 may set, as the initial value of the importance level of a bit obtained by conversion using such an effective conversion function, a value higher than values set as the initial values of the other bits.

Further, in selection of conversion rules, the information conversion apparatus 10 may redundantly select a conversion function that performs conversion into a bit having a high importance level. When executing such processing, the information conversion apparatus 10 is enabled to generate a conversion rule that generates a binary string that emphasizes positional relations between feature quantity vectors. As a result, when the information search apparatus 20 performs neighborhood search on query data, a smaller number of feature quantity vectors are acquired as a search result. Therefore, the information conversion apparatus 10 is enabled to, when the information search apparatus 20 performs matching with the query data, reduce the computational complexity involved therein and provide a higher processing speed to the search processing.

Additionally, the information conversion apparatus 10 is configured to generate N conversion functions each of which converts a feature quantity vector into one bit and select M conversion functions from the N conversion functions based on the importance levels of the respective bits, thereby generating a conversion for converting a feature quantity vector into an M-bit binary string. However, embodiments are not limited to this.

For example, the information conversion apparatus 10 generates not only conversion functions each of which converts a feature quantity vector into one bit but also conversion functions each of which converts a feature quantity vector into a binary string of a plurality of digits. At this time, the information conversion apparatus 10 performs the generations so that, in converting a feature quantity vectors into a binary string by using all of these generated conversion functions, the feature quantity vector may be converted into a binary string having a bit length longer than the bit length of a binary string to be used for the search processing. Then, the information conversion apparatus 10 may select conversion functions from the generated a plurality of conversion functions based on the importance levels of the respective bits so that the number of bits of a binary string into which the selected conversion functions convert a feature quantity vector may correspond to a bit length to be used in the search processing.

For example, the information conversion apparatus 10 generates a plurality of conversion functions each configured to convert a feature quantity vector into a 1-bit binary string, a plurality of conversion functions each configured to convert a feature quantity vector into a 2-bit binary string, and a plurality of conversion functions each configured to convert a feature quantity vector into a 3-bit binary string. Then, in a case where the bit length of each binary string to be used for the search processing is 15 bits, the information conversion apparatus 10 may select conversion functions as follows. For example, the information conversion apparatus 10 may select one of the conversion functions each configured to convert a feature quantity vector into a 1-bit binary string, one of the conversion functions each configured to convert a feature quantity vector into a 2-bit binary string, and four of the conversion functions each configured to convert a feature quantity vector into a 3-bit binary string.

(2) Regarding Forms for Embodiments

The information conversion apparatus 10 described above is an apparatus independent from the information search apparatus 20. However, embodiments are not limited to this, and, for example, the functions of the information conversion apparatus 10 may be included in the information search apparatus 20. Alternatively, the information conversion apparatus 10 may include the function to be executed by the binary conversion unit 23 of the information search apparatus 20, and may generate a conversion rule to be applied to feature quantity vectors stored in an information search apparatus currently in operation, and execute processing of generating binary strings by the application of the generated conversion rule.

(3) Regarding Mathematical Formulae

The mathematical formulae used by the information conversion apparatus 10 to calculate importance levels are simply examples, and the information conversion apparatus 10 may use mathematical formulae of any forms. That is, any mathematical formulae may be used as long as these formulae make it possible to increase the importance levels of conversion functions that are capable of reflecting, into binary strings, distance-based relations among feature quantity vectors and distinctions among classes to which feature quantity vectors belong. Further, the above described conversion functions are simply examples and the information conversion apparatus 10 may use conversion functions each containing another parameter. Further, the information conversion apparatus 10 may have no need to apply the same form, in terms of parameter, conversion matrix and the like, to conversion functions to be generated, and the conversion functions that generate the respective bits may take different forms.

(4) Program

Figure 7:
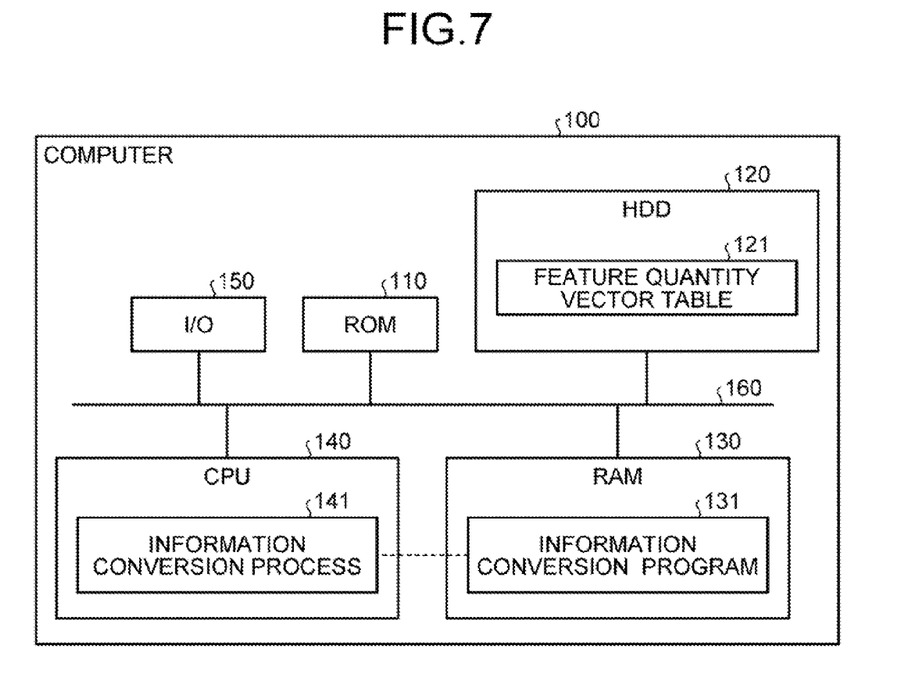
FIG. 7 is a diagram for illustrating one example of a computer that executes an information conversion program.

Incidentally, the information conversion apparatus 10 according to the first embodiment is described as a case that implements various kinds of processing by using hardware. However, embodiments are not limited to this, and the processing may be implemented by causing a computer included in the information conversion apparatus 10 to execute a previously provided program. Accordingly, one example of a computer that executes a program having the same functions as the information conversion apparatus 10 presented in the first embodiment is described below using FIG. 7. FIG. 7 is a diagram for illustrating one example of a computer that executes an information conversion program.

A computer 100 presented as an example in FIG. 7 has a ROM (Read Only Memory) 110, a HDD (Hard Disk Drive) 120, a RAM (Random Access Memory) 130, and a CPU (Central Processing Unit) 140 connected to one another via a bus 160. Further, the computer 100 presented as an example in FIG. 7 includes an I/O (Input/Output) 150 for transmitting and receiving packets.

The HDD 120 stores a feature quantity vector table 121 that stores feature quantity vectors to be converted. The RAM 130 has an information conversion program 131 previously stored therein. In the example illustrated in FIG. 11, the CPU 140 reads out the information conversion program 131 from the RAM 130 and executes this program, so that the information conversion program 131 starts to function as an information conversion process 141. Note that the information conversion process 141 performs the functions as those performed by the conversion rule generation unit 12, the importance level calculation unit 13 and the conversion rule determination unit 14, which are illustrated in FIG. 1.

Note that implementation of the information conversion program described in this embodiment is enabled by executing a previously provided program on a personal computer or a workstation. Such a program may be provided via a network such as the Internet. Further, such a program is recorded on a computer-readable recording medium such as a hard disk, a flexible disk (FD), a CD-ROM (Compact Disc Read Only Memory), an MO (Magneto Optical Disc), or a DVD (Digital Versatile Disc). Further, such a program may be executed by being read out from a recoding medium.

One embodiment makes it possible to optimize a conversion function without difficulty in a manner corresponding to a set of data to be searched.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information conversion rule generating apparatus comprising:
a memory; and
a processor coupled to the memory, wherein the processor executes a process comprising:
first generating a first conversion rule for converting a feature quantity vector into a binary string with a first bit length that is longer than a predetermined bit length;
converting a first plurality of feature quantity vectors into a first plurality of binary strings by using the first conversion rule, first relationship information that include relationships of the first plurality of feature quantity vectors being stored in the memory;
calculating distance fidelity values for each bit of a binary string converted by the first conversion rule, based on the first relationship information and bit values of the first plurality of binary strings; and
second generating a conversion rule for converting a feature quantity vector into a binary string with the predetermined bit length, based on the first conversion rule and the calculated distance fidelity values.

2. The information conversion rule generating apparatus according to claim 1, wherein
the first generating includes generating a plurality of conversion functions, as a result of converting a binary string that is longer than the predetermined bit length, which convert each of the feature quantity vectors into a binary sting having one bit or a plurality of bits; and
the second generating includes selecting conversion functions from generated conversion functions at the first generating, based on the calculated distance fidelity values, as a result of converting a binary string having predetermined bit length.

3. The information conversion rule generating apparatus according to claim 2, wherein the second generating includes:
identifying bits, out of the respective bits of a binary string converted at the converting by using first the conversion rule generated at the first generating, in descending order of the distance fidelity values until the number of identified bits reaches the number of bits corresponding to the predetermined bit length; and
selecting conversion functions for converting each of the feature quantity vectors into the identified bits at the identifying.

4. The information conversion rule generating apparatus according to claim 2, wherein
the processor repetitively executes a predetermined number of times a process, the process includes:
third generating a new conversion rule by adding a new conversion function to the corrected conversion functions at the second generating;
converting the feature quantity vectors into binary strings by using the conversion rule generated at the third generating;
calculating distance fidelity values for each bit of a binary string converted by the first conversion rule, based on the first relationship information and bit values of the first plurality of binary strings; and
fourth generating the conversion rule into one that converts the feature quantity vectors into binary strings each having the predetermined bit length based on the distance fidelity values calculated at the calculating.

5. The information conversion rule generating apparatus according to claim 2, wherein the second generating includes:
identifying bits, out of the respective bits of a binary string converted at the converting by using the conversion rule generated at the second generating, having the calculated distance fidelity values exceeding a predetermined threshold; and
selecting conversion functions for converting each of the feature quantity vectors into thus identified bits, wherein
the processor repetitively executes the process including causes the first generating and the calculating until conversion functions for converting the feature quantity vectors into identified bits are selected.

6. The information conversion rule generating apparatus according to claim 2, wherein
the first generating includes generating the conversion functions by using parameter vectors and offset parameters generated in a random manner.

7. The information conversion rule generating apparatus according to claim 1, wherein
the calculating includes calculating the distance fidelity values of the respective bits in each of the binary strings based on a difference between the smallest of hamming distances between pairs of binary strings where each of the pairs is converted by converting feature quantity vectors belonging to the same class and the smallest of the hamming distances between pairs of binary strings where each of the pairs is converted by converting feature quantity vectors belonging to different classes.

8. The information conversion rule generating apparatus according to claim 1, wherein
the process further comprises:
converting each of the feature quantity vectors into a binary string having the predetermined bit length by using the conversion rule changed at the second generating; and
searching feature quantity vectors that are located in the neighborhood of query data inputted by a client, by using hamming distances between a binary string obtained by converting the feature quantity vector of the query data and the binary strings obtained by converting the feature quantity vectors by using the conversion rule corrected at the second generating.

9. A computer-readable recording medium having stored therein a program for causing a computer to execute an information conversion rule generating process comprising:
first generating a first conversion rule for converting a feature quantity vector into a binary string with a first bit length that is longer than a predetermined bit length;
converting a first plurality of feature quantity vectors into a first plurality of binary strings by using the first conversion rule, first relationship information that include relationships of the first plurality of feature quantity vectors being stored in the memory;
calculating distance fidelity values for each bit of a binary string converted by the first conversion rule, based on the first relationship information and bit values of the first plurality of binary strings; and
second generating a conversion rule for converting a feature quantity vector into a binary string with the predetermined bit length, based on the first conversion rule and the calculated distance fidelity values.

10. An information conversion rule generating method implemented by a computer comprising:
first generating, using a processor, a first conversion rule for converting a feature quantity vector into a binary string with a first bit length that is longer than a predetermined bit length;
converting, using the processor, a first plurality of feature quantity vectors into a first plurality of binary strings by using the first conversion rule, first relationship information that include relationships of the first plurality of feature quantity vectors being stored in the memory;
calculating, using the processor, distance fidelity values for each bit of a binary string converted by the first conversion rule, based on the first relationship information and bit values of the first plurality of binary strings; and
second generating, using the processor, a conversion rule for converting a feature quantity vector into a binary string with the predetermined bit length, based on the first conversion rule and the calculated distance fidelity values.

11. The information conversion rule generating method implemented by the computer according to claim 10, wherein
the first generating includes generating a plurality of conversion functions, as a result of converting a binary string that is longer than the predetermined bit length, which convert each of the feature quantity vectors into a binary sting having one bit or a plurality of bits; and
the second generating includes selecting conversion functions from generated conversion functions at the first generating, based on the calculated distance fidelity values, as a result of converting a binary string having predetermined bit length.

12. The information conversion rule generating method implemented by the computer according to claim 11, wherein the correcting includes:
identifying bits, out of the respective bits of a binary string converted at the converting by using the first conversion rule generated at the generating, in descending order of the distance fidelity values until the number of identified bits reaches the number of bits corresponding to the predetermined bit length; and
selecting conversion functions for converting each of the feature quantity vectors into the identified bits at the identifying.

13. The information conversion rule generating method implemented by the computer according to claim 11, wherein the processor repetitively executes a predetermined number of times a process, the process includes:
- third generating a new conversion rule by adding a new conversion function to the corrected conversion functions at the second generating;
- converting the feature quantity vectors into binary strings by using the new conversion rule generated at the third generating;
- calculating distance fidelity values for each bit of a binary string converted by the first conversion rule, based on the first relationship information and bit values of the first plurality of binary strings; and
- fourth generating the conversion rule into one that converts the feature quantity vectors into binary strings each having the predetermined bit length based on the distance fidelity values calculated at the calculating.

14. The information conversion rule generating method implemented by the computer according to claim 11, wherein the second generating includes:
- identifying bits, out of the respective bits of a binary string converted at the converting by using the conversion rule generated at the second generating, having the calculated distance fidelity values exceeding a predetermined threshold; and
- selecting conversion functions for converting each of the feature quantity vectors into thus identified bits, wherein
- the processor repetitively executes the process including causes the first generating and the calculating until conversion functions for converting the feature quantity vectors into identified bits are selected.

15. The information conversion rule generating method implemented by the computer according to claim 11, wherein the first generating includes generating the conversion functions by using parameter vectors and offset parameters generated in a random manner.

16. The information conversion rule generating method implemented by the computer according to claim 10, wherein the calculating includes calculating the distance fidelity values of the respective bits in each of the binary strings based on a difference between the smallest of hamming distances between pairs of binary strings where each of the pairs is converted by converting feature quantity vectors belonging to the same class and the smallest of the hamming distances between pairs of binary strings where each of the pairs is converted by converting feature quantity vectors belonging to different classes.

17. The information conversion rule generating method implemented by the computer according to claim 10, further comprises:
- converting, using the processor, each of the feature quantity vectors into a binary string having the predetermined bit length by using the conversion rule changed at the second generating; and
- searching, using the processor, feature quantity vectors that are located in the neighborhood of query data inputted by a client, by using hamming distances between a binary string obtained by converting the feature quantity vector of the query data and the binary strings obtained by converting the feature quantity vectors by using the conversion rule corrected at second generating.

* * * * *